(12) United States Patent
Bennett et al.

(10) Patent No.: US 7,509,288 B2
(45) Date of Patent: Mar. 24, 2009

(54) INVOICE PROCESSING SYSTEM

(75) Inventors: Suzanne M. Bennett, West LaFayette, IN (US); Kevin A. Boone, Houston, TX (US); Lisa C. Fekler, Endicott, NY (US); Vincent P. Fox, Vestal, NY (US); Gerard J. Lenzo, Endicott, NY (US); Anthony T. Mazzatti, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 1532 days.

(21) Appl. No.: 09/792,187

(22) Filed: Feb. 22, 2001

(65) Prior Publication Data

US 2002/0116334 A1 Aug. 22, 2002

(51) Int. Cl.
*G06Q 40/00* (2006.01)

(52) U.S. Cl. ...................................................... 705/40

(58) Field of Classification Search .............. 705/35–43
See application file for complete search history.

(56) References Cited

U.S. PATENT DOCUMENTS

| | | | | |
|---|---|---|---|---|
| 5,258,855 A * | 11/1993 | Lech et al. | .................. | 358/462 |
| 5,699,528 A * | 12/1997 | Hogan | .......................... | 705/40 |
| 5,845,285 A | 12/1998 | Klein | | |
| 5,956,700 A * | 9/1999 | Landry | ......................... | 705/40 |
| 6,035,285 A * | 3/2000 | Schlect et al. | .................. | 705/30 |
| 6,035,295 A | 3/2000 | Klein | | |
| 6,044,362 A | 3/2000 | Neely | | |
| 6,052,671 A | 4/2000 | Crooks et al. | | |
| 6,058,380 A * | 5/2000 | Anderson et al. | ............. | 705/40 |
| 6,070,150 A | 5/2000 | Remington et al. | | |
| 6,128,603 A * | 10/2000 | Dent et al. | .................... | 705/40 |
| 6,343,275 B1 * | 1/2002 | Wong | .......................... | 705/26 |
| 6,360,211 B1 * | 3/2002 | Anderson et al. | ............. | 705/40 |
| 6,385,595 B1 * | 5/2002 | Kolling et al. | ................ | 705/40 |
| 6,760,746 B1 * | 7/2004 | Schneider | ................... | 709/203 |
| 6,775,827 B1 * | 8/2004 | Harkins | ...................... | 717/130 |
| 2002/0065736 A1 * | 5/2002 | Willner et al. | ................ | 705/26 |
| 2002/0107794 A1 * | 8/2002 | Furphy et al. | ................. | 705/40 |

OTHER PUBLICATIONS

McDonell, Edwin D. Document Imaging Technology: How Automated Solutions are Revolutionizing the Way Organizations and People Work. Probus Publishing Co. Salem, Massachusetts. 1993. pp. 48-50.*

(Continued)

*Primary Examiner*—James A Kramer
*Assistant Examiner*—Jason M Borlinghaus
(74) *Attorney, Agent, or Firm*—John Pivnichny; Hoffman Warnick LLC

(57) ABSTRACT

A system and method for processing payment requests submitted in various formats. The system comprises an imaging system for recording paper invoices in a human readable format; a web payment request system for receiving invoice information via a graphical user interface and for generating an electronic invoice; an approval routing system for electronically routing approval requests; and an accounts payable preprocessing system that provides real-time auditing of the electronic invoice to the web payment request system while invoice information is being received.

15 Claims, 4 Drawing Sheets

OTHER PUBLICATIONS

Alexander, Antoinette. Pioneers on the Virtual Frontier. American Banker. New York, NY. vol. 16, iss. 1. Nov. 5, 2000. p. 18.*

Business Editors & High Tech Writers. Cyberbills Opens New Bill Scanning Facility Converting Paper Bills Into Electronic Format. Business Wire. New York. Jun. 20, 2000. p. 1.*

Toonkel, Jessica. On-Line Banking: AMEX, GE Beat Banks Into EBPP Both Using Paytrust's Scan & Pay System. American Banker. New York, NY. vol. 165, iss. 124. Jun. 28, 2000. p. 1.*

Robek, Mary F, Brown, Gerald F & Stephens, David O. Information and Records Management: Document-Based Information Systems 4th. Glencoe/McGraw-Hill. 1995. pp. 343-344.*

Price, John E, Haddock, M. David & Brock, Horace R. College Accounting 7th Edition. Macmillan/McGraw-Hill School Publishing Company. Westerville, Ohio. 1994. p. 230.*

* cited by examiner

INVOICE PROCESSING SYSTEM

BACKGROUND OF THE INVENTION

1. Technical Field

The present invention relates to accounts payable processing systems, and more particularly relates to a web based system for receiving and processing electronic and paper invoices.

2. Related Art

Almost all large organizations face the ongoing challenge of implementing an efficient accounts payable system. In particular, the collecting, reviewing and paying of supplier invoices are fraught with problems for organizations having large volumes of such invoices. The challenge becomes particularly complex because such organizations often have multiple divisions that perform different functions and exist at disparate geographical locations. Because large organizations are required to pay for many different types of goods and services from many different sources, there tends to be little uniformity in the manner in which invoices are received and processed. This lack of uniformity makes automation difficult and leads to overall inefficiencies in the accounting process.

The lack of invoice uniformity arises for various reasons. For instance, some suppliers may be equipped to submit payment requests electronically, while others may be only equipped to submit fax or paper invoices. Those suppliers submitting paper invoices may use a variety of paper formats, generally dictated by the supplier's accounting system. In addition to receiving invoices from outside suppliers, some invoices may originate internally from, for instance, employees seeking reimbursement.

In addition to the overall lack of uniformity in the format of invoices, the process of handling invoices once they are received may differ depending upon the type of payment request. For example, the accounts payable system may not require extensive details for regularly recurring matters (e.g., purchase orders or "PO's") since the vendor information may already be stored by the system. Conversely, non-recurring matters will generally require additional details that may not be available from the supplier, but rather may need to be provided by an internal person who made the request. Moreover, some invoices may require approval, while others may not. Accordingly, because large organizations must deal with so many types of invoices and payment request procedures, the ability to efficiently automate the processing of invoices and to provide useful and timely accounts payable information is severely limited.

Most related art automated solutions are directed at facilitating the supplier's invoicing and payment collection process, as opposed to providing a solution for organizations (i.e., consumers) that must deal with many different suppliers. Such an example of a "supplier solution" is taught in U.S. Pat. No. 5,699,528, issued to Hogan, entitled, SYSTEM AND METHOD FOR BILL DELIVERY AND PAYMENT OVER A NETWORK, which is hereby incorporated by reference.

U.S. Pat. No. 6,058,380, issued to Anderson et al., entitled, SYSTEM AND METHOD FOR ELECTRONICALLY PROCESSING INVOICE INFORMATION, which is hereby incorporated by reference, teaches a "consumer solution" for processing invoices received from suppliers, but relies on an intermediary, such as a bank, to receive and process the invoices. Accordingly, it fails to provide a solution for organizations that utilize their own accounts payable system.

Accordingly, the related art fails to provide an adequate solution that will allow accounts payable departments to automate the processing of invoices. Without such a solution, large organizations will continue to have unacceptable accounting inefficiencies.

SUMMARY OF THE INVENTION

The present invention addresses the above mentioned problems, as well as others, by providing a system for receiving and processing invoices. In a first aspect, the invention provides an invoice processing system, comprising: an imaging system for recording a paper invoice in a human readable format; a web payment request system for receiving invoice details and saving the invoice details as an electronic invoice; and an accounts payable system for processing the electronic invoice, wherein the accounts payable system includes a preprocessor that feeds back audit information to the web payment request system as the invoice details are being inputted.

In a second aspect, the invention provides an invoice processing system, comprising: means for accepting a non-purchase order paper invoice; means for accepting a purchase order paper invoice; means for accepting an on-line non-purchase order invoice; means for accepting an on-line purchase order invoice; means for converting each of the non-purchase order paper invoice, purchase order paper invoice, on-line non-purchase order invoice, and on-line purchase order invoice into electronic invoices; and means for automatically routing approval requests for the electronic invoices.

In a third aspect, the invention provides a program product stored on a recordable medium for processing invoices, that when executed, comprises: an imaging system for recording paper invoices in a human readable format; a web payment request system for receiving invoice information via a graphical user interface and for generating an electronic invoice; an approval routing system for electronically routing approval requests; and an accounts payable preprocessing system that provides real-time auditing of the electronic invoice to the web payment request system while invoice information is being received.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

The present invention provides an overall architecture, as well as various systems and methods for receiving and processing invoices. For the purposes of this invention, the terms "invoice(s)," "payment request(s)," and "request(s) for payment" have the same meaning and can be used interchangeably. Generally, the terms refer to a demand for payment directed to an organization from an internal or external source. An "organization" may include a company or other entity that purchased, agreed to purchase, or has otherwise consumed some goods or services, and is responsible for payment of an associated invoice. An "accounts payable department" may generally comprise an entity within the organization that oversees the payment of invoices.

Figure 1:
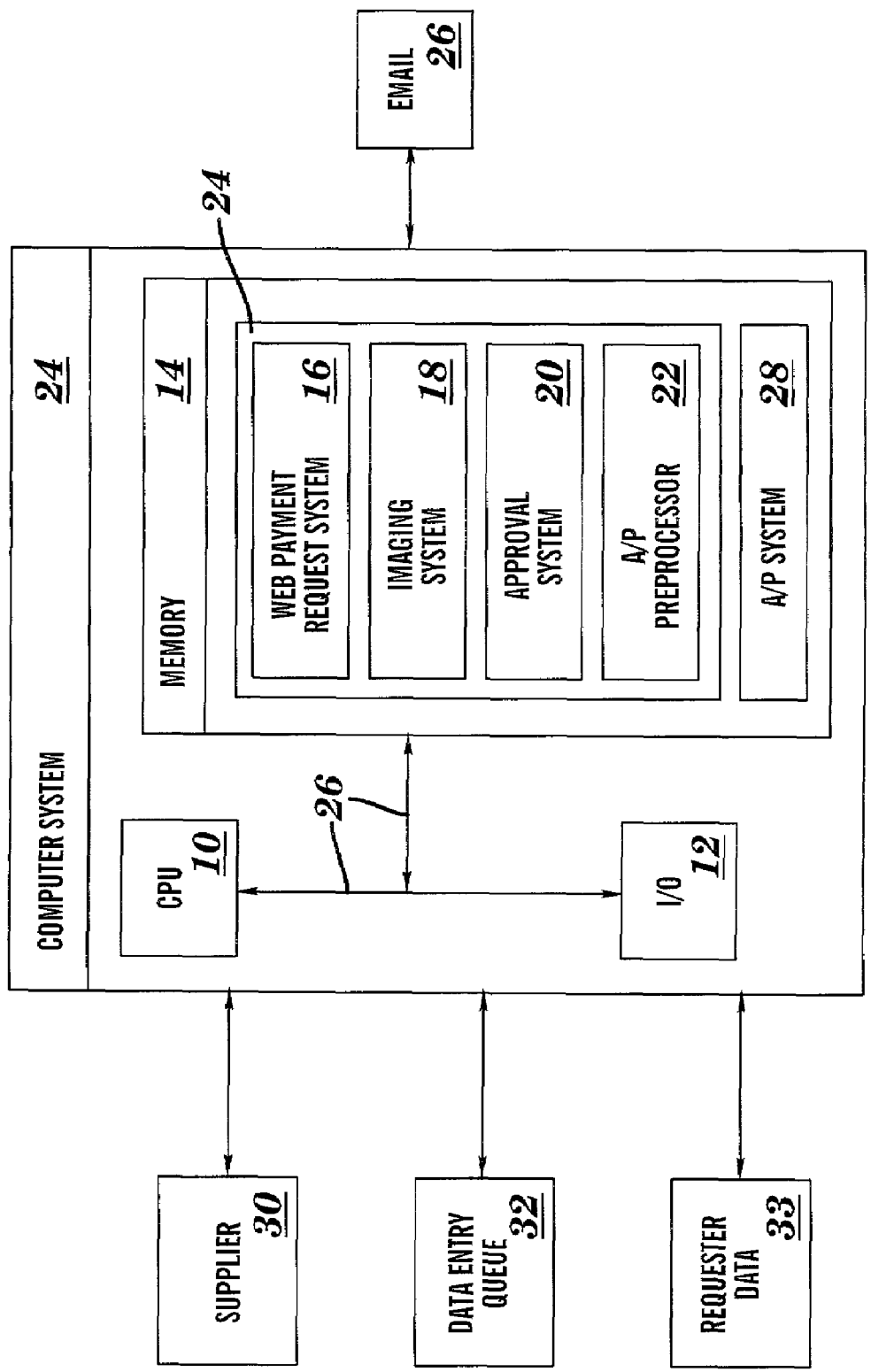
FIG. 1 depicts an invoicing system in accordance with a preferred embodiment of the present invention.

Referring now to the figures, FIG. 1 depicts a computer system 24 for receiving and processing invoices. Computer system 24 comprises a central processing unit (CPU) 10, an input/output (I/O) 12, memory 14 and a bus 26. Memory 14 may comprise any known type of data storage and/or transmission media, including magnetic media, optical media, random access memory (RAM), read only memory (ROM), a data object, etc. Moreover, memory 14 may reside at a single physical location, comprising one or more types of data storage, or be distributed across a plurality of physical systems in various forms. CPU 10 may likewise comprise a single processing unit, or be distributed across one or more processing units in one or more locations, e.g., on a client and server. I/O 12 may comprise any known type of input/output device, including, a network system, modem, keyboard, mouse, voice, CRT, printer, disk drives, etc. Bus 26 provides a communication link between the components in the computer system 24 and likewise may comprise any known type of transmission link, including electrical, optical, radio, etc. In addition, although not shown, additional components, such as cache memory, communications systems, etc., may be incorporated into computer system 24.

It is understood that the present invention can be realized in hardware, software, or a combination of hardware and software. The components of computer system 10 according to the present invention can be realized in a centralized fashion, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, module or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Payment requests are received by computer system 24 either directly by a supplier 30, or indirectly via a data entry queue 32. A supplier 30 may include, for example, an outside vendor supplying goods or services to the organization, an employee seeking reimbursement from the organization, etc. Rather than submitting a paper or fax invoice, supplier 30 may submit a payment request directly to computer system 24 via an interface over a network. Preferably, supplier 30 utilizes a computer or terminal device (not shown) having a web browser to interact with one or more HTML (hypertext markup language) pages at a website available on the world wide web. While it is preferable that access to computer system 24 is provided by a web browser having an easy to use graphical user interface, it is understood that any device that can access the web could be used, such as a web phone, personal digital assistant, etc. From the website, supplier 30 can enter the necessary data and avoid having to submit a paper invoice.

Alternatively, in the case where a supplier is not able to communicate directly to computer system 24, a supplier may submit a paper or fax invoice that will be received by an accounts payable department(APD) and manually entered into computer system 24 via the data entry queue 32. In this case, the accounts payable department can utilize the same interface as that described above to enter the invoice data from the paper/fax invoice.

Furthermore, in some cases additional data from an internal requester (e.g., an employee) who requested or consumed the goods or services may be required. Such data, referred to herein as "requester data" 33 can likewise be entered directly to computer system 24 via the above-described interface. When such additional requester data 33 is required, the requester may be notified by e-mail system 26.

Stored in memory 14 is a web invoicing system 24 and an accounts payable system 28. Accounts payable system 28 may comprise any customized, semi-customized, or off-the-shelf accounts payable program, such as ones sold under the trade name SAP™ Inc. Web invoice system 24 provides a front end solution to accounts payable system 28 to efficiently receive and streamline the processing of payment requests. Specifically, web invoice system 24 comprises a web payment request (WPR) system 16, an imaging system 18, an approval system 20, and an accounts payable preprocessor 22.

Web payment request system 16 includes a web interface to allow for data entry of invoice details by suppliers, requesters, accounts payable departments, etc. Once received, web payment request system 16 can convert the collected information into an electronic invoice that can ultimately be submitted and processed by approval system 20 and accounts payable system 28. An electronic invoices may comprise data stored, for example, in a data structure or data object that can be easily processed. Electronic invoices can be transmitted in, for example, an EDI (electronic data interface) or XML (extensible markup language) format. Web payment request system 16 may comprise various features, including user id/ password authentication; multiple access levels; fax and scan capabilities; field validation; real-time auditing; ability to retrieve and display scanned documents; and reporting.

Imaging system 18 provides a system for converting and storing invoices in a human readable format. A "human readable format" refers to a digital image that can be electronically stored and then displayed to appear as a readable document (e.g., a bitmap of a scanned-in document). Images stored in a human readable format can be viewed by WPR system 16. (Storage of such information in a human readable format is typically required in order to comply with various accounting and legal practices.) Imaging system 18 therefore includes a scanning facility, as well as the ability to convert electronically submitted payment requests and electronic invoices into a human readable format. Additional features of imaging system 18 may include barcode scanning; document routing and work queue processing; comment insertion; security, e.g., restricting display of sensitive documents; faxing; labeling; archiving historical data; reporting; etc.

Approval system 20 provides an automated way of obtaining approvals for electronic invoices. Approval system 20 utilizes a communications system, such as e-mail system 26, to route approval requests and obtain approvals from the appropriate third party. Features provided by the approval system include: delegation; parallel approval processing; reminder processing; escalation processing; status inquiries; etc.

Accounts payable preprocessor 22 is responsible for performing various auditing and editing checks of electronic invoices created by web payment request system 16. Some of these auditing features may be implemented in real-time so that a supplier 30 entering information on the web payment request system 16 can be notified if an issue exists with respect to a particular payment request as it is being entered. Additional features of accounts payable preprocessor 22 include edit checking against real-time data; supplier communication; ability to receive different data formats; ability to post documents and lift blocks; real-time communication with accounts processing system 28; reporting; etc.

One feature of this invention is the ability to provide an interface that will allow payment requests to be received in different formats. In particular, payment requests can be received in a paper (or fax) format, as well as in an online (e.g., web) format. For each of the paper and/or online formats, there are generally two categories of payment requests: (1) purchase order (PO) invoices, and (2) non-purchase order (non-PO) invoices. Purchase order invoices may generally be defined as regularly recurring payment requests from a supplier. Purchase order invoices are typically affiliated with a supplier that has already supplied some information (e.g., supplier details) to the accounts payable department. Alternatively, non-purchase order invoices may be defined as non-regularly recurring payment requests. As such, non-purchase order invoices are generally not affiliated with information already stored in accounts payable system 28. Thus, non-purchase order invoices generally require additional information to be gathered in order for the payment request to be processed. Examples of purchase order invoices may, for example, include utility bills, office supplies, etc. Examples of non-purchase order invoices may include employee reimbursement, legal fees, etc. Thus, there are four general categories of payment requests that are handled by the embodiments described herein: (1) paper PO invoices; (2) paper non-PO invoices; (3) online PO invoices; and (4) online non-PO invoices.

Figure 2:
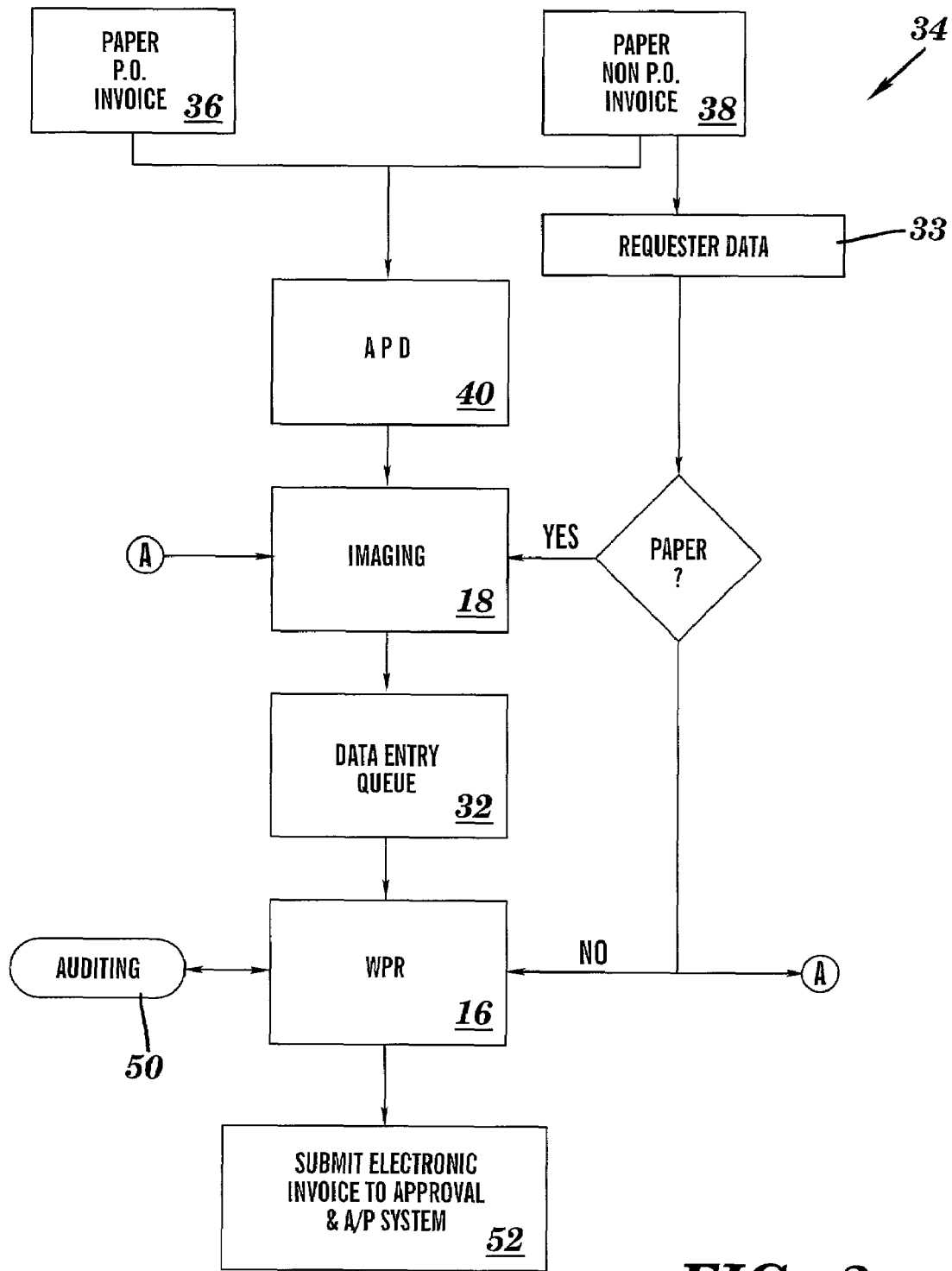
FIG. 2 depicts a flow diagram of a system for receiving paper invoices.

Referring now to FIG. 2, a process 34 is depicted of a system for receiving both paper PO and paper non-PO invoices. The process 34 includes the initial step of submitting the paper invoice, whether it is a PO 36 or a non-PO 38, to an accounts payable department (APD) 40. From there, the accounts payable department 40 submits the paper invoice to imaging system 18, where the invoice will be scanned and stored in a human readable format. From there, the invoice will be placed into data entry queue 32 for entry into web payment request system 16.

If the paper invoice is a non-PO invoice 38, additional requester data 33 may be obtained 42. If requester data 33 is obtained in a paper format, that information is then submitted to the imaging system 18 to be saved in a human readable format, queued for data entry 32, and entered into web payment request (WPR) system 16. Alternatively, if requester data 33 is submitted in an online format, it is submitted directly to web payment request (WPR) system 16. The online requester data 33 may also be converted and stored in a human readable format by imaging system 18.

As information is being entered into web payment request system 16, the information may be checked by auditing process 50 as will be described in further detail below. Once the requisite data and information is obtained by web payment request system 16, an electronic invoice can be created and submitted for approval and accounts payable processing 52. The approval and accounts payable processing 52 is described in further detail below with respect to FIG. 4.

Figure 3:
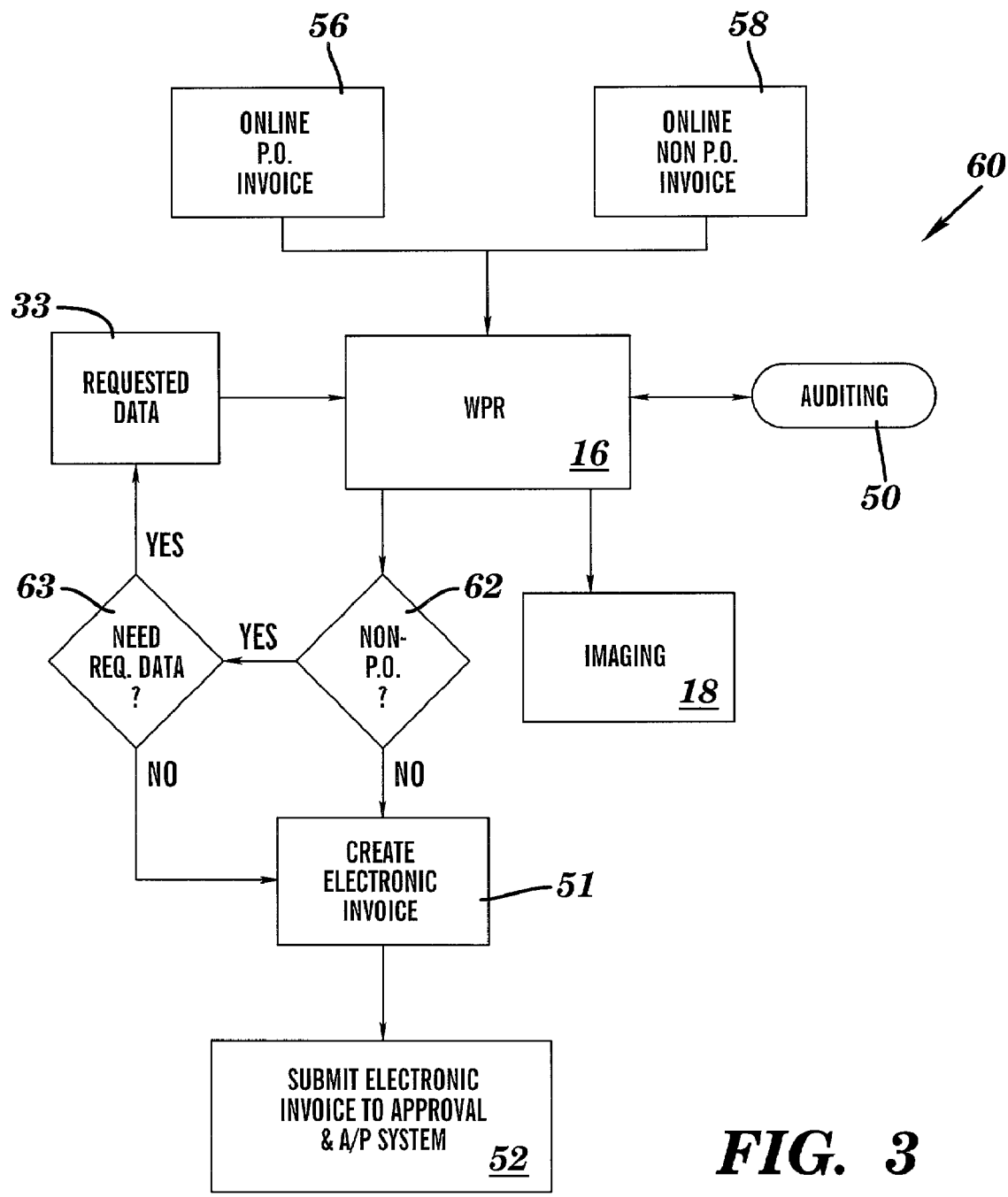
FIG. 3 depicts a flow diagram of a system for receiving electronic invoices.

Referring now to FIG. 3, a system 60 for submitting online PO invoices 56 and online non-PO invoices 58 is depicted. In this case, the supplier submits the requisite data directly to web payment request system 16. As with the previous case, data will be checked by auditing system 50 as the data is being entered into web payment request system 16 by the supplier. Once the information is entered, a determination 62 is made as to whether the invoice is a PO or non-PO invoice. If it is a non-PO invoice, a determination 63 is made as to whether requester data 33 is required. If requester data 33 is required, requester data 33 is obtained and entered by the requester directly into web payment request system 16. The requester can be notified by email system 26 (FIG. 1) and provided with an HTTP (hypertext transfer protocol) link that will direct the requester to the appropriate web page where requester data 33 can be entered.

If no requester data 33 is required 63, or the invoice is a PO invoice 62, then an electronic invoice can be created 51 by WPR 16. In addition to creating the electronic invoice, WPR 16 also causes imaging system 18 to save the electronic invoice in a human readable format. Once the electronic invoice is created and saved, it can be submitted to the approval and accounts payable system 52 for processing.

In both the online and paper cases described above (FIGS. 2 and 3), web payment request system 16 may comprise the necessary systems for notifying the requester that additional invoice details are required, and for allowing the requester to enter the additional invoice details. The notification system may comprise a software program that checks to see if all necessary data fields in an electronic invoice are complete, and an email server that sends notification emails to the appropriate party when incomplete fields are detected. To enter the data, WPR system 16 may comprise an interface such as an HTML page that prompts the requester to enter the necessary information.

Figure 4:
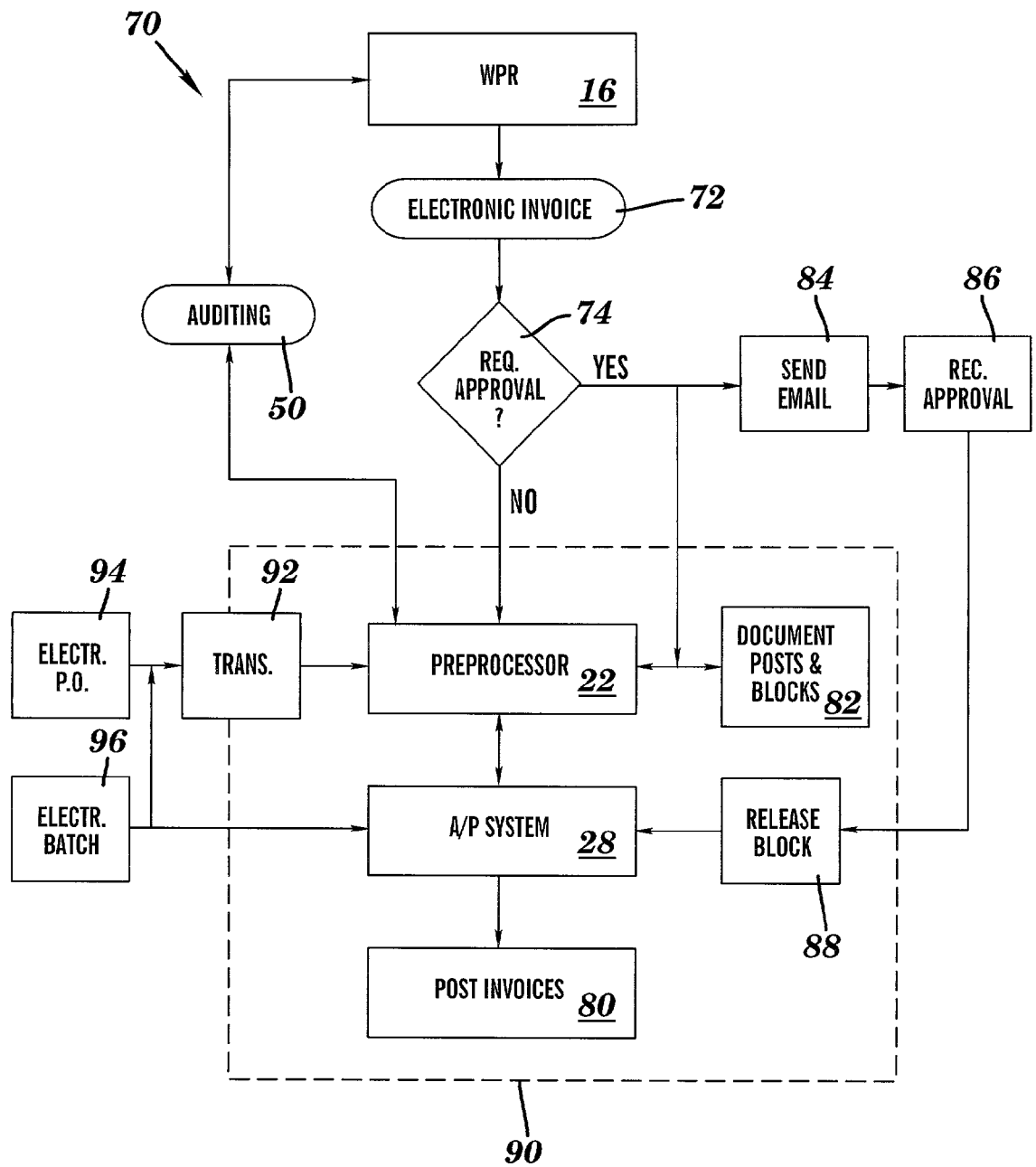
FIG. 4 depicts a flow diagram of a system for processing electronic invoices.

Referring now to FIG. 4, a system 70 is provided for approving and processing an electronic invoice 72. System 70 includes an electronic invoice processing system 90, which comprises the components for processing inputted electronic invoices. As described above with respect to FIGS. 2 and 3, regardless of the invoice input format, ultimately web payment request system 16 generates an electronic invoice 72. Once the electronic invoice 72 is created, a determination 74 can be made as to whether or not an approval request is required. If an approval request is not required, the electronic invoice 72 can be submitted directly to the accounts payable preprocessor 22 for processing. If an approval request is required, e-mail is sent 84 to the appropriate party (e.g., a manager) and the electronic invoice is blocked 82 indicating that it cannot be processed by accounts payable system 28. Once an approval is received 86, the block is released 88, the electronic invoice can be processed by accounts payable system 28, and the invoice can be posted 80. Similarly, in the case where no approval is required, the accounts payable system 28 can further process the electronic invoice and post the invoice 80.

In addition to allowing for the processing of invoices submitted in various formats as described above, the system also allows for the traditional processing of electronic purchase orders 94 (non-web) and electronic batch processing 96. Electronic purchase orders 94 are those purchase orders that are generally submitted to the system 90 in a standard format such as EDI, FOX and EBX. Electronic batch processing 96 may comprise both PO and non-PO invoices submitted in a batch format. In some cases, because the electronic purchase orders 94 and electronic batch invoices 96 may be submitted in various formats, a translator 92 may be required to convert the information into a format understandable by accounts payable preprocessor 22.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. An invoice processing system, comprising:
    an imaging system for scanning and storing a paper invoice in a human readable format, wherein the paper invoice can comprise a purchase order (PO) invoice or a non-purchase order (non-PO) invoice, wherein the imaging system comprises operational capabilities that include barcode scanning, document routing and work queue processing, comment insertion, security, faxing, labeling, archiving historical data and reporting;
    a data entry queue for receiving the scanned paper invoice from the imaging system;
    a web payment request system for receiving invoice details including the scanned paper invoice from the data entry queue and for generating an electronic invoice, the web payment request system further comprising:
        a system for determining if the scanned paper invoice is a PO invoice or a non-PO invoice;
        a system for determining if additional invoice details are required, if the scanned paper invoice is determined to be a non-PO invoice;
        a system for notifying a party associated with a non-PO invoice that additional invoice details are required; and
        a system for allowing the party to enter the additional invoice details for the non-PO invoice; and
    an accounts payable system for processing the electronic invoice, wherein the accounts payable system includes a preprocessor for auditing the electronic invoice in real-time and for notifying the web payment request system if a problem exists as the invoice details are being inputted, wherein the preprocessor comprises operational capabilities that include edit checking of the electronic invoice against real-time, supplier communication relating to the electronic invoice, receiving the electronic invoice in different data formats, posting the electronic invoice, lifting blocks on the electronic invoice, reporting of the electronic invoice and real-time communication with the accounts payable system.

2. The invoice processing system of claim 1, wherein the imaging system includes a mechanism for saving the electronic invoice in the human readable format.

3. The invoice processing system of claim 1, wherein the web payment request system can view the electronic invoice in the human readable format.

4. The invoice processing system of claim 1, wherein the system for notifying provides an electronic document link for entering the additional invoice details.

5. The invoice processing system of claim 1, further comprising an approval system for obtaining an approval from a third party before the accounts payable system will process the electronic invoice, wherein the approval system uses email communications to route an approval request to the third party and to obtain the approval from the third party, wherein the approval system comprises operational capabilities that include parallel approval processing of the electronic invoice, reminder processing of the electronic invoice, escalation processing of the electronic invoice and status inquires.

6. The invoice processing system of claim 5, wherein the approval system causes the accounts payable system to block a posting of the electronic invoice until the approval is obtained.

7. The invoice processing system of claim 6, wherein the approval system causes the accounts payable system to unblock the posting of the electronic invoice when the approval is obtained.

8. The invoice processing system of claim 1, wherein the accounts payable system can further receive and process non-web based electronic invoices.

9. The invoice processing system of claim 1, wherein the accounts payable system can further receive and batch process electronic invoices.

10. The invoice processing system of claim 1, wherein the accounts payable system further includes a system for documenting all posted and blocked invoices.

11. An invoice processing system comprising:
    an imaging system for recording paper invoices in a human readable format, wherein the paper invoices can comprise a purchase order (PO) invoice or a non-purchase order (non-PO) invoice, wherein the imaging system comprises operational capabilities that include barcode scanning, document routing and work queue processing, comment insertion, security, faxing, labeling, archiving historical data and reporting;
    a web payment request system including a data entry queue for receiving invoice information via a graphical user interface and for generating an electronic invoice, the web payment request system further comprising:
        a system for determining if the scanned paper invoice is a PO invoice or a non-PO invoice;
        a system for determining if additional invoice details are required, if the scanned paper invoice is determined to be a non-PO invoice;
        a system for notifying a party associated with a non-PO invoice that additional invoice details are required; and
        a system for allowing the party to enter the additional invoice details for the non-PO invoice;
    an approval routing system for electronically routing approval requests, wherein the approval routing system comprises operational capabilities that include parallel approval processing of the electronic invoice, reminder processing of the electronic invoice, escalation processing of the electronic invoice and status inquires; and
    an accounts payable preprocessing system that provides real-time auditing of the electronic invoice to the web payment request system while invoice information is being received, wherein the accounts payable preprocessing system comprises operational capabilities that include edit checking of the electronic invoice against real-time, supplier communication relating to the electronic invoice, receiving the electronic invoice in different data formats, posting the electronic invoice, lifting blocks on the electronic invoice, and reporting of the electronic invoice.

12. The invoice processing system of claim 1, wherein the imaging system can record electronic invoices received by the web payment request system in a human readable format.

13. The invoice processing system of claim 12, wherein the web payment request system can display invoices in a human readable format.

14. The invoice processing system of claim 1, wherein the accounts payable accounting preprocessing system interfaces with an accounts payable system that can process the electronic invoice.

15. The invoice processing system The program product of claim 14, wherein the approval routing system includes a system for causing the accounts payable system to block the processing of the electronic invoice until an approval is obtained.

* * * * *